United States Patent [19]

Wu et al.

[11] 4,086,809

[45] May 2, 1978

[54] ACOUSTIC NON-INTRUSIVE METHOD FOR CHECK OF THE SET POINT OF A SPRING-LOADED MECHANICAL DEVICE

[75] Inventors: Peter T. K. Wu, Clifton Park; John R. M. Viertl, Schenectady, both of N.Y.

[73] Assignee: General Electric Company, Schenectady, N.Y.

[21] Appl. No.: 761,533

[22] Filed: Jan. 24, 1977

[51] Int. Cl.² .............................................. G01L 1/10
[52] U.S. Cl. .................................... 73/161; 73/579; 73/DIG. 1
[58] Field of Search ........... 73/559, 67.2, 161, DIG. 1

[56] References Cited

U.S. PATENT DOCUMENTS

| | | | |
|---|---|---|---|
| 2,782,633 | 2/1957 | Stauss et al. | 73/67.2 |
| 2,784,588 | 3/1957 | Humble et al. | 73/67.2 X |
| 3,232,102 | 2/1966 | Goss et al. | 73/67.2 X |
| 3,394,587 | 7/1968 | Freeman | 73/67.2 X |

*Primary Examiner*—Charles A. Ruehl
*Attorney, Agent, or Firm*—Donald R. Campbell; Joseph T. Cohen; Marvin Snyder

[57] ABSTRACT

A loaded spring in a pressure relief valve or other spring-loaded device is excited with acoustic vibrations and the resonant frequencies of selected vibration modes are measured. Changes in spring constant due to aging and high temperature are detected by monitoring the longitudinal vibration mode resonant frequency, and changes in loading by monitoring the transverse and/or torsional vibration mode resonant frequency. The pressure set point is ascertained from manufacturing data of resonant frequency versus set point.

10 Claims, 6 Drawing Figures

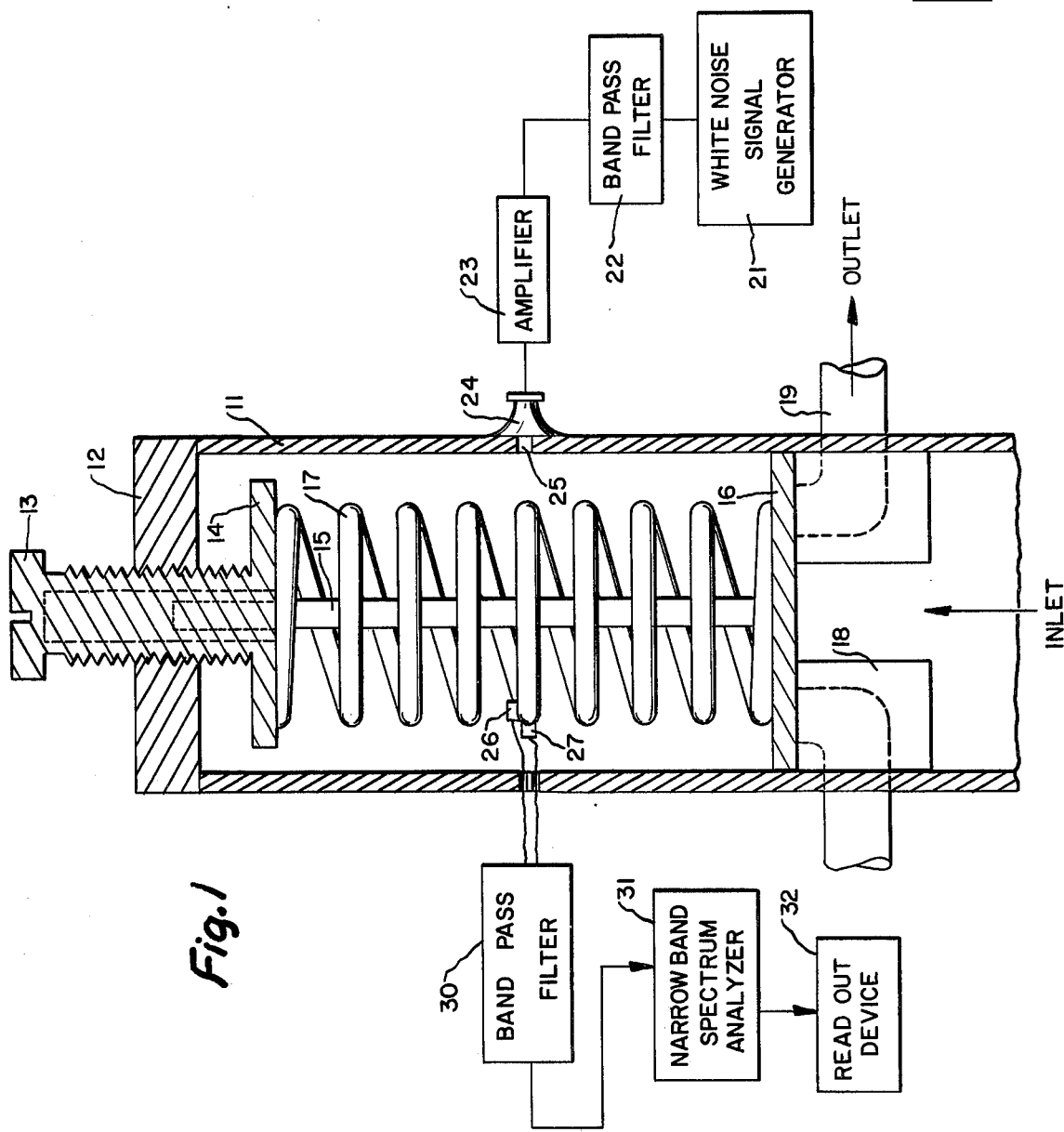

ACOUSTIC NON-INTRUSIVE METHOD FOR CHECK OF THE SET POINT OF A SPRING-LOADED MECHANICAL DEVICE

BACKGROUND OF THE INVENTION

This invention relates to an acoustic method for testing the spring in a spring-loaded mechanical device, and more particularly to an acoustic non-intrusive method for checking the set point of the spring-loaded device by monitoring the resonant frequencies of various vibration modes of the spring.

The steam pressure safety/relief valves of boiling water nuclear reactors have been identified as a major problem. One common failure mode is shifting of the pressure set point at which the valve opens outside of the allowable specifications as the result of aging of the spring and valve parts under high temperature conditions. According to applicable licensing regulations, safety/relief valves must be checked periodically for pressure set point. The existing procedure for testing the pressure set point is very costly and time-consuming. The valve, which is several feet high, must be removed from the reactor and checked with high pressure steam supply in the factory. Besides the expense and lost down time, this procedure provides little information about incipient failure. Moreover, removing the valve from the reactor and testing it with high pressure steam also increases greatly the possibility of the valve not reseating well due to the intrusion of foreign material.

The present invention is directed to an acoustic method for determining non-intrusively the set point of a spring-loaded mechanical device, in particular the set pressure of a pressure relief valve.

SUMMARY OF THE INVENTION

By measuring the resonant frequencies of a plurality of preselected, acoustically excited vibration modes of a loaded spring in a spring-loaded device, shifts in the force or pressure required to overcome the spring loading and operate the device can be detected without disassembly and removal from service. Changes in spring constant, for example due to aging or other variations in the spring material, are detected by monitoring the resonant frequency of the longitudinal vibration mode. Changes in loading, for example due to dimension changes and loading force changes with aging, are detected by monitoring the resonant frequency of certain transverse or torsional vibration modes. The force or pressure set point is obtained by reference to production data of resonant frequency versus set point.

In the preferred method as applied to determination of the pressure set point of a safety/relief valve, an electrical signal is generated having all of the frequencies in a predetermined frequency range and is employed to energize a transducer that produces acoustic vibrations which are coupled to the loaded coil spring and excite the selected vibration modes. A speaker is the transducer for airborne excitation or a shaker for structural-borne excitation. The mechanical vibrations of the spring are sensed and an electrical signal representative of the spring vibrations is produced and filtered so as to pass only the predetermined frequency range. The filtered signal is processed to derive the resonant frequency of each selected vibration mode by measuring and displaying the amplitude at a plurality of discrete narrow frequency bands covering the frequency range of interest. The resonant frequency is indicative of the pressure set point at which the pressure relief valve becomes operative.

BRIEF DESCRIPTION OF THE DRAWINGS

FIG. 1 is a simplified schematic diagram of a large spring-loaded pressure relief valve including, in block diagram form, an acoustic excitation system and a sensor and resonant frequency or pressure set point indicating electronic system;

FIGS. 2–4 are fragmentary perspective views of a coil spring turn illustrating the placement of the acoustic transducer or transducers for sensing, respectively, longitudinal mode vibrations, transverse mode vibrations, and torsional mode vibrations;

DESCRIPTION OF THE PREFERRED EMBODIMENTS

Figure 5:
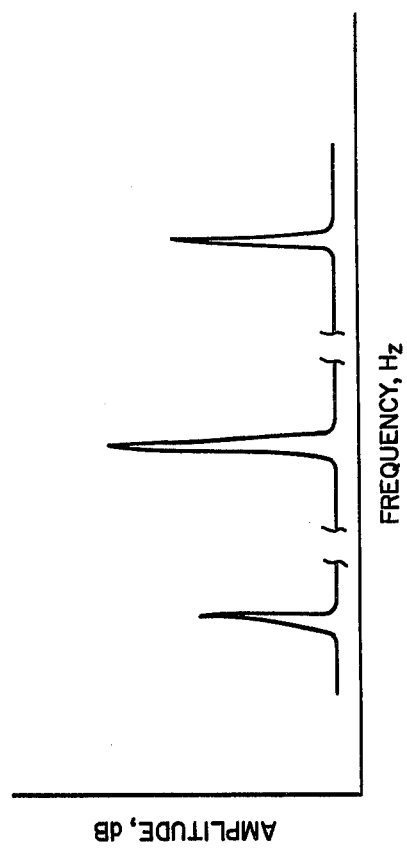
FIG. 5 is a typical oscilloscope display of amplitude versus frequency from which the measured resonant frequencies for the several vibration modes are ascertained.

Over a long period of time, the dimensions of a loaded spring may change. For instance, when a loaded coil spring is under high temperature for a long period of time, the spring dimensions can change due to creep, which is defined as a slow change of dimensions of the object due to prolonged exposure to high temperature and stress. Also, in a spring-loaded device having a set point, there can be changes in the dimensions of any parts holding the spring, or variations in any mechanical linkage such as a release mechanism which acts on the spring. All these possible changes in dimensions will be reflected as a change in the loading of the spring which will affect the set point. Therefore, by monitoring the transverse or torsional resonant frequencies of a loaded coil spring, changes in the set point of the spring-loaded device can be detected. Any change of the spring material, for example, due to high temperature, aging, etc., will result in a change of spring constant. This kind of change, although not likely to happen, can be detected by monitoring the resonant frequencies of the longitudinal vibration modes. Mechanical defects such as cracks developed in the spring ordinarily also show up as changes in resonant frequencies.

Referring to FIG. 1, the exemplary embodiment of the invention is a large spring-loaded pressure relief or safety valve associated with a high pressure steam line. The pressure relief valve is illustrated in simplified diagrammatic form to facilitate understanding of the invention. A more detailed sketch of such a valve is given under the heading "Safety Valve" in the McGraw-Hill Encyclopedia of Science and Technology, McGraw-Hill Book Company, Inc., Copyright 1960, Library of Congress Catalog Card No. 60-11000. Briefly, the pressure relief valve includes a cylindrical metal casing 11 closed at the top by a circular end plate 12 having a central threaded aperture through which extends the threaded stem of a load force adjustment bolt 13. An upper washer 14 is secured to the end of adjustment bolt 13, which further has a hollow stem slidably receiving an end of central guide rod 15, the other end of the guide rod being attached to a lower washer 16. Helical coil spring 17 is mounted about the guide rod bearing at either end against upper and lower washers 14 and 16 and urging the lower washer into engagement with an annular valve seat 18. High steam pressure exceeding the pressure set point acts against the surface of lower washer 16 to overcome the force loading the coil spring, lifting the lower washer off of valve seat 18 and allowing escape of the steam through outlet 19 to relieve the excessive pressure condition. In most operating valves, construction is such that whenever the valve opens slightly the opening force builds up to open it fully and to hold the valve open until the pressure drops a predetermined amount. By turning adjustment bolt 13, the loading forces acting to compress coil spring 17 and therefore the pressure set point at which the valve is operative to move from closed to open position can be adjusted.

According to the invention, acoustic vibrations within a predetermined frequency range are coupled to the loaded coil spring to excite selected vibration modes, and the resonant frequency of each vibration mode is determined. The pressure or force set point is then obtained by reference to production data of resonant frequency versus set point. Shifts in resonant frequency as compared to the new condition of the spring, as was previously discussed, are caused by aging of the spring and valve parts, exposure to high temperature and stress, and other factors. The method herein described has the capability of detecting a change in pressure or force set point without disassembling the valve. The method also provides on-line set point monitoring capability.

The excitation system comprises a white noise signal generator 21 for generating an electrical signal with a flat frequency spectrum. A bandpass filter 22 is provided to select the frequency range of interest, which in general is in the range of 0-10,000 Hz and is adjusted to optimize excitation of all the desired coil spring vibration modes. For instance, the frequency range can be 2,500-4,500 Hz. Since the shifts in resonant frequency that are being detected are relatively small, the excitation signal should contain substantially all the frequencies within the predetermined frequency range. The excitation electrical signal, after amplification by an amplifier 23, is used to energize an electroacoustic speaker 24 and generate airborne sound waves that propagate through an aperture 25 in casing 11 and excite loaded coil spring 17. Instead of a speaker for airborne excitation, an electromagnetic shaker can be substituted to provide structural-borne excitation in which the acoustic vibrations travel through the valve casing and other metal parts to the coil spring. Natural excitation can also be relied on when the naturally occurring vibrations have the appropriate frequencies.

The sensor and resonant frequency readout system, as broadly defined, senses the mechanical vibrations of the loaded coil spring and generates an electrical signal representative of these spring vibrations, filters the electrical signal to pass a prescribed range of frequencies, and processes the filtered signal to derive the resonant frequency of each selected vibration mode. An accelerometer or other sensor for detecting the mechanical spring vibrations is usually mounted directly on the coil spring itself, although this is not essential. Accelerometers have directional characteristics and are located on the coil turn for sensing longitudinal, transverse, and torsional motion as shown respectively in FIGS. 2-4. The longitudinal vibration mode is sensitive to a change in spring constant, but is not sensitive to changes in loading or loading forces. The transverse and torsional vibration modes are sensitive to both changes in loading and changes in spring constant. Ordinarily, measuring the resonant frequency of either the transverse or torsional vibration mode is sufficient to detect a shift in the pressure set point caused by changes in loading. In FIGS. 2 and 3, accelerometers 26 and 27 are mounted on the top (or bottom) and side of the spring wire to sense longitudinal and transverse motion. In FIG. 4, two diametrically opposing accelerometers 28 are required in conjunction with a differential amplifier 29 to sense torsional motion.

The electrical signals generated by a plurality of sensors as just described are fed individually or are combined and fed in common to a bandpass filter 30 (see FIG. 1). This filter passes only the predetermined frequency range and eliminates processing vibrations that may be present outside of the range of interest. The filtered electrical signal is processed by measuring and displaying the amplitude at a plurality of discrete narrow frequency bands covering a selected frequency range. To this end, a narrow band spectrum analyzer 31 is provided having an electrically tuned filter which sweeps through the incoming signal and successively measures the amplitude of the signal at a large number of adjacent, very narrow frequency bands. Readout device 32 is an oscilloscope for displaying amplitude versus frequency information. The display on the oscilloscope screen takes the form illustrated in FIG. 5, and is characterized by three peaks derived individually or all at once designating the resonant frequencies of the longitudinal transverse, and torsional vibration modes, assuming that all three are measured. The narrow band spectrum analyzer and oscilloscope are commercially available equipment, of course, although other arrangements having the required sensitivity can be substituted. Shifts in resonant frequency, it is repeated, indicating changes in pressure or set point are often relatively small.

Figure 6:
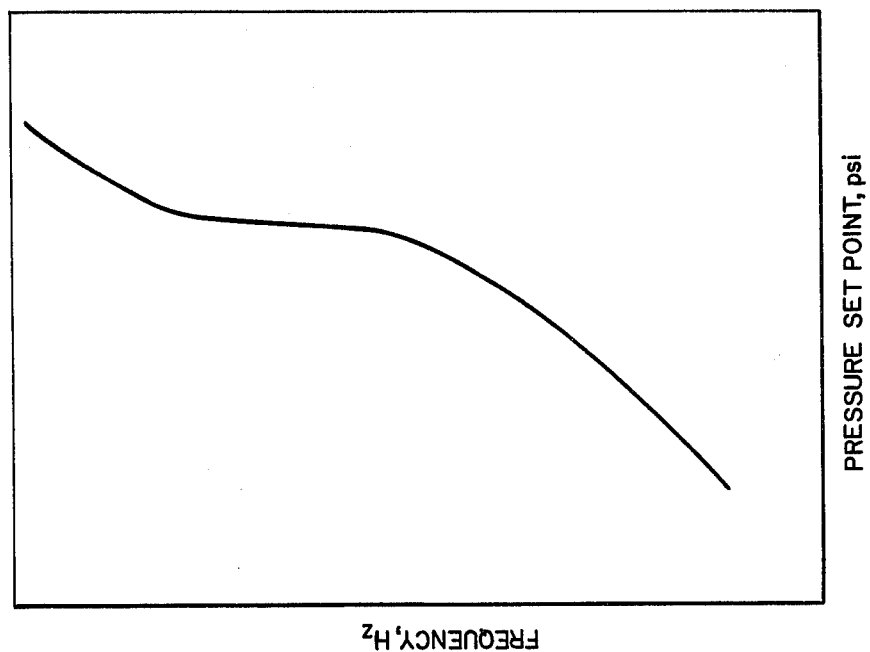
FIG. 6 is a resonant frequency versus pressure set point curve for the transverse vibration mode similar to that obtained during a valve production test.

FIG. 6 shows a representative curve of production data for the transverse vibration mode in which resonant frequency is plotted against pressure set point in psi. Having measured the current resonant frequency for that mode, the corresponding pressure set point is read off from the curve. If not within allowable limits, steps can be taken to adjust the loading and bring the pressure set point within specifications. Production data curves are required for all the other vibration modes being monitored, including at least the longitudinal vibration mode to check for changes in pressure set point resulting from changes in the wire material and therefore the spring constant. The production data curves must cover the full range over which the valve is expected to operate in service, and such production data curves are unique to a particular valve so that the curves and valves must be numbered. One application of the invention is checking the set pressure of a spring-loaded pressure relief valve for a nuclear reactor high pressure steam line to an accuracy of about 1 percent. A typical set pressure is 1050 psi, which means that a variation of 10.5 psi is detected. As more broadly defined, the acoustic non-intrusive method is applicable to any spring-loaded mechanical device, with a metallic or equivalent spring in compression or tension and further including torsion springs, having a pressure or force set point to be checked.

While the invention has been particularly shown and described reference to a preferred embodiment thereof, it will be understood by those skilled in the art that various changes in form and details may be made therein without departing from the spirit and scope of the invention.

The invention claimed is:

1. A non-intrusive acoustic method for determining the set point of a loaded spring in a spring-loaded mechanical device comprising the steps of:

coupling acoustic vibrations at a plurality of frequencies to said loaded spring to excite selected vibration modes thereof, sensing the mechanical vibrations of said loaded spring and generating at least one electrical signal representative of said spring vibrations, filtering said electrical signal to pass a predetermined range of frequencies, and processing said filtered electrical signal to derive the resonant frequency of each selected vibration mode as an indication of the associated set point of said mechanical device at which the force loading said spring is overcome.

2. The method according to claim 1 wherein the selected vibration modes that are excited include the longitudinal vibration mode and at least one of the transverse and torsional vibration modes.

3. The method according to claim 2 wherein the selected vibration modes that are excited include both the transverse and torsional vibration modes.

4. The method according to claim 2 wherein the step of processing said filtered electrical signal comprises measuring and displaying the amplitude of said filtered signal at each of a plurality of discrete narrow frequency bands.

5. The method according to claim 2 wherein the step of coupling acoustic vibrations to said loaded spring comprises generating a second electrical signal having substantially all of the frequencies within said predetermined range of frequencies, and utilizing said second electrical signal to energize a transducer for producing said acoustic vibrations.

6. The method according to claim 2 wherein the step of coupling acoustic vibrations to said loaded spring comprises generating a second electrical signal having substantially all of the frequencies within said predetermined range of frequencies, and utilizing said second electrical signal to energize an electroacoustic speaker for producing airborne sound waves that excite said loaded spring.

7. A non-intrusive acoustic method for determining the the pressure set point of a loaded coil spring in a pressure relief valve comprising the steps of:

generating a first electrical signal having substantially all of the frequencies within a predetermined frequency range, energizing a transducer with said first electrical signal and producing acoustic vibrations that are coupled to said loaded coil spring and excite a plurality of selected vibration modes thereof, sensing the mechanical vibrations of said loaded coil spring and generating a second electrical signal representative of said spring vibrations.

filtering said second electrical signal to pass only said predetermined frequency range, and processing said filtered second electrical signal by measuring and displaying the amplitude at a plurality of discrete narrow frequency bands covering said predetermined frequency range to thereby derive the resonant frequency of each selected vibration mode as an indication of the associated pressure set point at which the pressure relief valve is operative.

8. The method according to claim 7 wherein the selected vibration modes of said loaded coil spring that are excited include the longitudinal vibration mode and at least one of the transverse and torsional vibration modes.

9. The method according to claim 8 wherein the selected vibration modes that are excited include both the transverse and torsional vibration modes.

10. The method according to claim 8 wherein the step of energizing a transducer and producing acoustic vibrations comprises energizing an electroacoustic speaker and producing airborne sound waves that excite said loaded coil spring.

* * * * *